Figure 1:
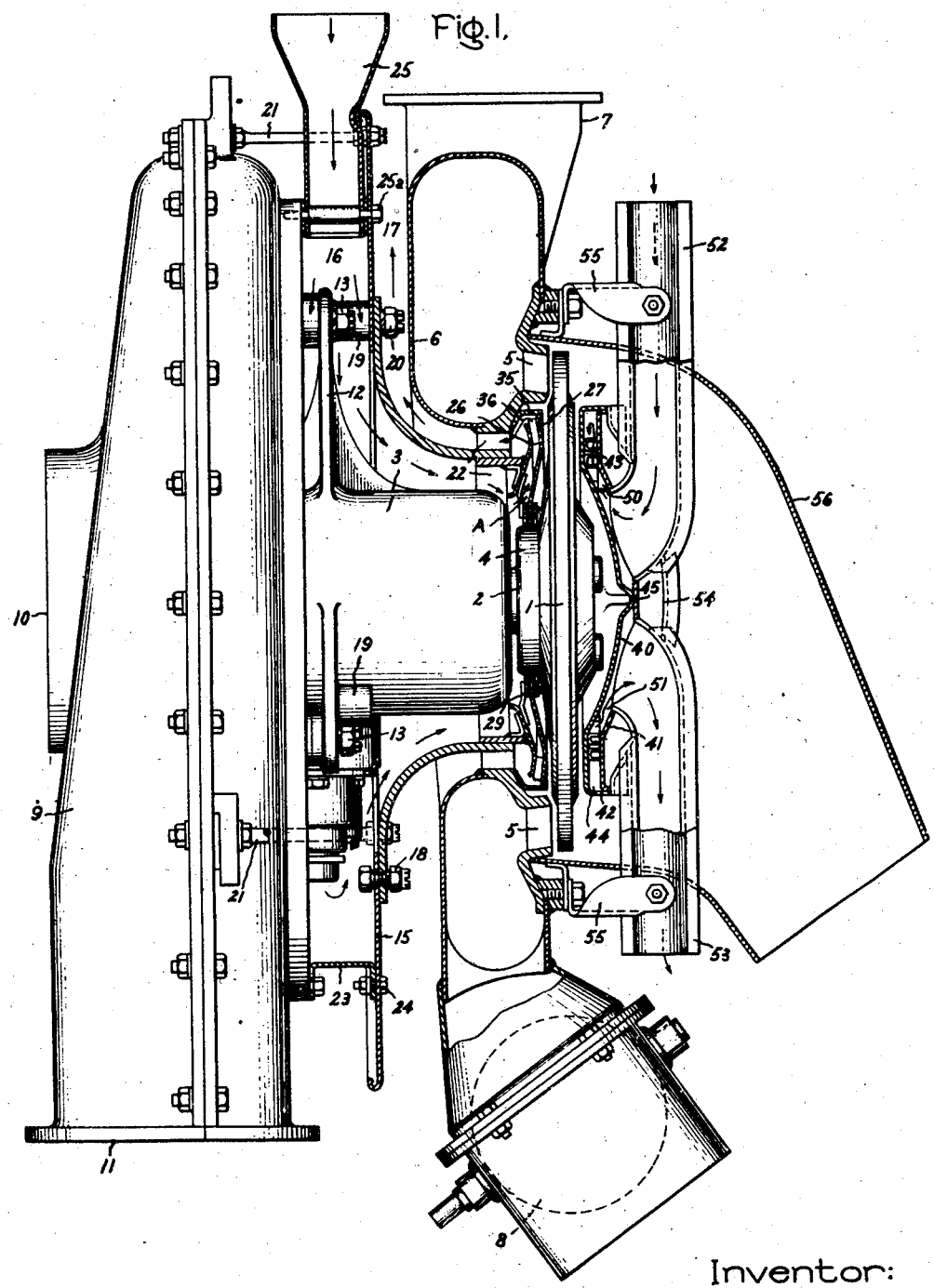

Jan. 28, 1947.    D. D. STREID    2,414,840
COOLING MEANS FOR GAS TURBINE WHEELS
Filed Feb. 23, 1942    2 Sheets-Sheet 1

Inventor:
Dale D. Streid,
by Harry E. Dunham
His Attorney.

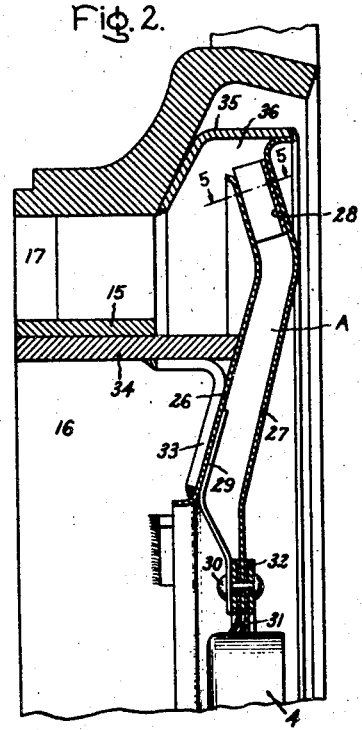
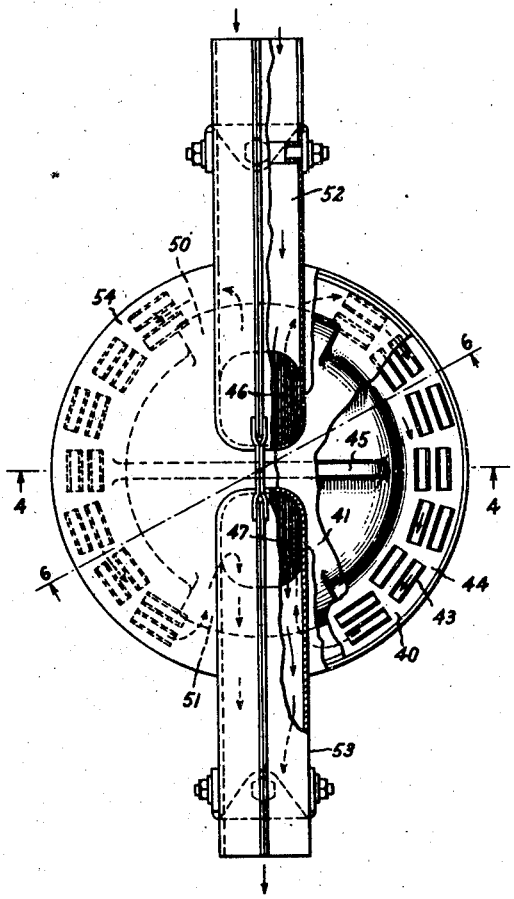
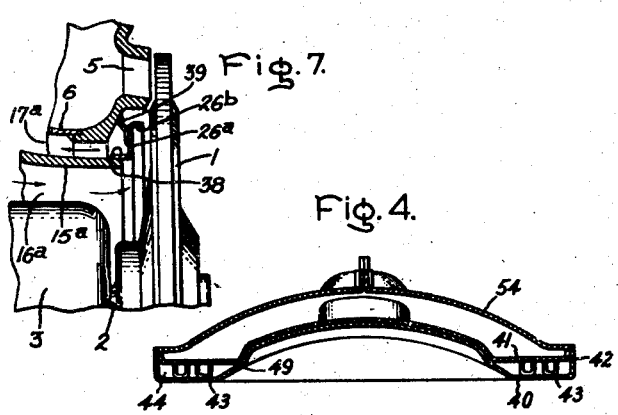
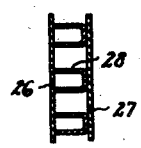
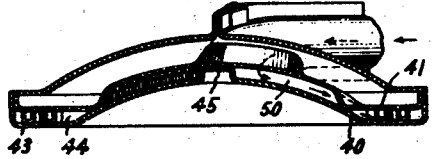

Patented Jan. 28, 1947

2,414,840

UNITED STATES PATENT OFFICE 2,414,840

COOLING MEANS FOR GAS TURBINE WHEELS

Dale D. Streid, West Lynn, Mass., assignor to General Electric Company, a corporation of New York Application February 23, 1942, Serial No. 431,924

5 Claims. (Cl. 60—41)

The present invention relates to gas turbines and especially to cooling means for the wheels of such turbines.

The invention is well adapted for use in connection with gas turbine driven superchargers for aircraft and it is this application of my invention which I have elected specifically to illustrate and describe. It is to be understood, however, that the invention is not limited thereto necessarily.

The object of my invention is to provide an improved construction and arrangement for cooling gas turbine wheels, and for a consideration of what I believe to be novel and my invention, attention is directed to the following specification and the claims appended thereto.

In the drawings, Fig. 1 is a side elevation, partly in section, of a gas turbine driven supercharger embodying my invention; Fig. 2 is a sectional view on an enlarged scale of a portion of the structure shown in Fig. 1; Fig. 3 is a front view of a cooling cap, parts being broken away to better illustrate the structure; Fig. 4 is a sectional view taken on line 4—4, Fig. 3; Fig. 5 is a detail sectional view taken on line 5—5, Fig. 2; Fig. 6 is a sectional view on line 6—6, Fig. 3; and Fig. 7 is a detail view of a modification.

Referring to the drawings, 1 indicates the turbine wheel of a supercharger overhung on the end of a shaft 2 carried in a bearing 3. On its inner side wheel 1 is provided with a hub 4. Gas is supplied to the buckets of the turbine wheel by a ring of nozzles 5 carried by and forming a part of an annular nozzle box 6 which surrounds bearing 3 in spaced relation thereto. Gases, for example, exhaust gases from an aircraft engine, are conveyed to the nozzle box through conduit 7. At 8 is the usual waste valve for regulating the supply of gases to the turbine wheel in a well understood manner.

On the other end of shaft 2 is the impeller of the centrifugal compressor which is located in compressor casing 9. The inlet to the compressor is indicated at 10 and the discharge at 11. The compressor casing 9 is spaced axially from nozzle box 6 and is supported from bearing 3 by a plurality of spaced arms 12 formed integral with the bearing and attached by bolts 13 to the compressor casing.

The structure so far described is a known one and is to be taken as typical of any suitable gas driven turbo-compressor or turbine driven supercharger.

Located in the annular space between the compressor, the nozzle box and the bearing, is an annular curved wall 15 which divides such space into two curved annular passages 16 and 17. In the present instance, wall 15 is shown as being formed from two plates suitably fastened together by a plurality of bolts 18. It may, however, be formed from a single plate. The inner edge of wall 15 terminates adjacent to the web of turbine wheel 1; the outer edge terminates somewhat beyond the outer peripheral portion of nozzle box 6. Wall 15 is supported at its central portion by a plurality of circumferentially spaced posts 19 formed integral with arms 12 and against which the wall rests and to which it is attached by bolts 20. It is supported at its periphery by a plurality of spaced bolts 21 which at one end are attached to the compressor casing flange and at the other end to the wall. Wall 15 is supported at its inner edge by webs 22 suitably welded to the wall and to the adjacent surfaces of nozzle box 6 and bearing 3. Thus, wall 15 is fixed rigidly in position in spaced relation to the nozzle box, the compressor casing and the bearing.

Passage 16 forms an annular cooling air admission passage. It is closed around its periphery by a circular wall or shroud 23 having outturned flanges which are attached to wall 15 and to the compressor casing by rings of spaced bolts 24. At its upper end, wall 23 is provided with an opening in which is fastened an air admission funnel or ram 25 by means of bolts 25ª.

When the supercharger is mounted on the aircraft, ram 25 is connected with a suitable conduit (not shown) having an open end or ram which faces into the slip stream and which serves to convey air from the slip stream to ram 25 and through it to passage 16. Thus passage 16 is supplied with cooling air from the aircraft slip stream.

At the inner end of wall 15 is a sealing ring and air directing shield A shown in enlarged section in Fig. 2. It comprises two circular plates or disks 26 and 27 held in spaced relation to each other at their outer edges by circumferentially spaced U-shaped spacers 28 (see Fig. 5) welded to the plates, and at their inner edges by circumferentially spaced straps 29 which are welded to plate 26 and are attached to plate 27 by rivets 30. Rivets 30 serve also to attach to plate 27 a plurality of packing or sealing rings 31 which cooperate with the peripheral surface of hub 4 to prevent flow of air to the annular space between plate 27 and the turbine wheel. Sealing rings 31 may be made of copper or other suitable material and are held between suitable metal rings 32. Shield A is attached to wall 15 by circumferentially spaced angle bars 33 welded to plate 26 and to a ring 34 which forms a continuation of and is fixed to wall 15. Ring 34 fits tightly against plate 26 to prevent flow of air therebetween. The shield is attached to the outer surface of the nozzle box by a ring 35 which at one edge is welded to the periphery of plate 27 and at the other edge to the nozzle box. Ring 35 is located beyond the periphery of ring 26 and the space between it and ring 27 and provides an air flow passage 36 which connects the space between plates 26 and 27 to passage 17.

The path of flow of cooling air is shown by the arrows in Fig. 1. Air flows through ram 25 to passage 16 whence it flows down over and across the bearing and through the inner curved portion of annular passage 16 to the space between plates 26 and 27, entering such space next to the bearing, i. e., the central portion of the wheel, and flowing radially outward between the plates and through passage 36 and passage 17 whence it discharges to atmosphere. With this arrangement, it will be seen that the cooling air flows first over and around bearing 3, after which it flows radially outward from adjacent to the central portion of the wheel toward the periphery thereof. In flowing over the bearing, the air absorbs heat from it, after which it flows along the inner side of the turbine wheel, absorbing heat from it. Thus, the air while coolest flows over the bearing which is cooler than the turbine wheel and thence alongside the turbine wheel from the cooler portion of the wheel to the hottest portion, the wheel being hottest adjacent the buckets. This arrangement whereby the cooling air flows over the cooler parts first serves to give the most efficient cooling of all the parts. It will be noted that in this arrangement the cooling air does not come into direct contact with the turbine wheel but flows through an annular passage adjacent the surface of the wheel, the cooling air absorbing heat from the wheel by conduction of heat through plate 27. The U-shaped spacers 28 serve as cooling fins for conveying heat from the plate 27 to the air flowing over them.

If desired, plate 27 may be omitted, the cooling air being then brought into direct contact with the surface of the wheel. Such an arrangement is shown in Fig. 7 wherein wall 15ª, corresponding to wall 15 of Fig. 1, defines passages 16ª and 17ª corresponding to passages 16 and 17 of Fig. 1 and serves to direct cooling air through passage 16ª directly into contact with the surface of wheel 1. Wall 15ª terminates in spaced relation to wheel 1 and fixed to its end is an annular air directing plate 26ª having a peripheral flange 26ᵇ facing toward the surface of wheel 1. Plate 26ª is fixed to wall 15ª by a flange welded thereto as shown at 38 and it is fixed to the nozzle box by a plurality of spaced clips 39 welded to the plate and the nozzle box.

With this arrangement, cooling air flows through passage 16ª over bearing 3 and thence radially outward along the surface of wheel 1 and around the outer edge of plate 26ª to chamber 17ª. This arrangement wherein the cooling air comes into direct contact with the wheel surface effects efficient cooling of the wheel.

Otherwise, the arrangement shown in Fig. 7 may be the same as that shown in Fig. 1.

In connection with both Figs. 1 and 7, it will be noted that shroud or wall 23 serves to completely close or seal the admission passage 16 (or 16ª) around its periphery, forming in substance a sealed admission chamber. As a result, air supplied to this chamber through ram 25 provides a positive and adequate supply of air to the parts to be cooled. This arrangement wherein I provide a sealed admission passage or chamber to which cooling air is supplied and from which it flows around the bearing and across the turbine wheel and nozzle box, I regard as being an important feature of my invention.

The above-described arrangement for cooling the inlet side of the turbine wheel is more particularly disclosed and claimed in my divisional application Serial No. 594,626, filed May 19, 1945, and assigned to the same assignee as the present application.

In connection with the cooling means at the rear of the wheel, as described, I may with advantage utilize a cooling means at the front of the wheel. Preferably the cooling means for the front of the wheel does not direct cooling air directly against the surface of the wheel but absorbs heat by conduction through a wall adjacent to the wheel, although if desired I may employ an arrangement which directs more or less cooling air directly against the wheel. To this end, I employ a cooling cap comprising two disk-shaped plates 40 and 41 fixed together at their peripheral edges, as indicated at 42, and held in spaced relation by U-shaped spacers 43, the spacers being arranged circumferentially along opposite sides of the cap as shown in Fig. 3 and forming cooling fins. Plates 40 and 41 are dished outwardly and at their central portions are shaped to provide a circumferentially extending chamber 44 in which the spacers 43 are located and a central chamber divided by a transverse rib 45 to form an air admission chamber 46 and an air discharge chamber 47. The rib between chambers 45 and 46 is struck up from plate 40. The engagement between plates 40 and 41 to form chamber 44 is indicated at 49. The chamber 46 is connected to annular chamber 44 by a passage 50 and the chamber 47 is connected to annular chamber 44 by a passage 51. Passages 50 and 51 are located diametrically opposite each other as is shown in Figs. 1 and 3. Connected to the admission chamber 46 for conveying cooling air thereto is a cooling air inlet conduit or ram 52 and connected to the discharge chamber 47 is a cooling air discharge conduit 53. Fixed over the outer side of plate 41 is a cover plate 54 for directing flow of gases from the buckets of the turbine wheel and for shielding plate 41 from direct contact with such gases. The cooling cap is supported by suitable brackets 55 which attach it to the nozzle box. In connection with the turbine wheel, I may employ a hood 56 for directing gases discharged from the buckets into the slip stream.

Thus the device for cooling the front or discharge side of the wheel in accordance with my invention comprises two plates 40 and 41 which have outer portions sealed together to form two half annular passages with inlets and outlets respectively facing each other and formed by diametrically opposite portions of the disks. The passages are connected in parallel to conduit means for circulating cooling medium therethrough. A third disk 54 is sealed to the outer edge portions of the first mentioned disks to reduce heat transfer through one of said disks.

In operation, conduit or ram 52 receives air from the slip stream. To this end, it may face into the slip stream of the aircraft, or it may be connected with a conduit which does face into the slip stream. Air flows through conduit 52 to chamber 46 and as indicated by the arrows in Figs. 1 and 3 flows from chamber 46 through passage 50 to chamber 44 where it divides and passes through chamber 47 and thence out through discharge conduit 53. The air in flowing through annular chamber 44 and across fins 43 absorbs heat from wheel 1 by conduction through plate 40. The cooling air does not come into direct contact with wheel 1.

By the form of my invention wherein I utilize cooling means for the turbine wheel in which cooling air does not come into direct contact with the wheel, I avoid afterburning, i. e., the burning of air which becomes mixed with exhaust gases. Afterburning is objectionable as it may occur adjacent the wheel, a thing which may result in excessive heating of the turbine wheel. Afterburning is also undesirable as it forms a torch which is visible at night. At the same time by this arrangement I am enabled to cool the wheel satisfactorily by conduction of heat to the cooling air through walls adjacent to the wheel.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A radiation type cooling device for a turbine wheel comprising two circular plates having outer and intermediate portions sealed together to form two half annular passages with the ends of the passages facing each other, and channel means connected to the adjacent ends of the passages for circulating cooling medium therethrough.

2. A radiation type cooling device for a turbine wheel comprising two circular plates having portions sealed together to form two half annular passages with the ends of the passages facing each other, channel means for connecting the adjacent ends of the passages and circulating cooling medium therethrough, and a plurality of circumferentially extending fins secured to one of the plates within said passages.

3. A radiation type cooling device for turbine wheels comprising two circular plates having edge portions and intermediate circumferentially extending portions sealed together to form two half annular passages with inlets and outlets respectively facing each other, conduits connected to the inlets and outlets respectively for conducting cooling medium to the passages and discharging cooling medium therefrom, and a third circular plate united with said conduits and sealed to the outer edges of the first mentioned plates to form a heat insulating space therewith to reduce heat transfer through one of the plates.

4. A gas turbine comprising a shaft, a bearing supporting the shaft, a bucket wheel secured to an overhung portion of the shaft, a nozzle box located on one side of the wheel for conducting operating medium thereto, an exhaust casing for receiving operating medium discharged from the wheel, and a device located substantially within the exhaust casing for cooling the discharge side of the wheel, said device comprising a first plate facing the wheel and having a rim portion closely spaced therewith, a second plate spaced from the first plate and having portions sealed thereto to form two half annular channels with inlets and outlets respectively facing each other, and means for circulating cooling medium through said passages.

5. A gas turbine comprising a shaft, a bearing supporting the shaft, a bucket wheel secured to an overhung portion of the shaft, a nozzle box located on one side of the wheel and surrounding the bearing for conducting operating medium to the wheel, an exhaust casing secured to the nozzle box for receiving operating medium discharged from the wheel, and a radiation type cooling device located substantially within the exhaust casing for cooling the discharge side of the wheel, said device comprising a first plate facing the wheel and having a rim portion closely spaced therewith, a second plate spaced from the first plate and having portions sealed thereto to form two half annular channels with inlets and outlets near diametrically opposite portions of the plates, and means including a third plate having an outer edge sealed to the outer edges of the second plate and conduits secured to the third plate and projecting through the exhaust casing for conducting cooling medium through the channels and to reduce heat transfer from the exhaust space through the second plate and brackets for supporting end portions of the conduits on the nozzle box.

DALE D. STREID.